United States Patent [19]

Morris et al.

[11] Patent Number: 4,654,531
[45] Date of Patent: Mar. 31, 1987

[54] GATED STRIP PROPORTIONAL DETECTOR

[75] Inventors: Christopher L. Morris; George C. Idzorek, both of Los Alamos; Leroy G. Atencio, Espanola, all of N. Mex.

[73] Assignee: The United States of America as represented by the United States Department of Energy, Washington, D.C.

[21] Appl. No.: 702,751

[22] Filed: Feb. 19, 1985

[51] Int. Cl.$^4$ .............................................. H01J 47/18
[52] U.S. Cl. ..................................... 250/385; 250/374
[58] Field of Search ............................ 250/385 R, 374

[56] References Cited

U.S. PATENT DOCUMENTS 4,465,933  8/1984  Perez-Mendez et al. ............ 250/385
4,479,059  10/1984  Morris et al. ........................ 250/385

OTHER PUBLICATIONS

Hough et al., *Nuclear Instruments and Methods*, "Proportional Counters for the Localisation of Ionising Radiation", vol. 2, Sep. 1972, pp. 365–372.

*Primary Examiner*—Janice A. Howell
*Assistant Examiner*—David P. Porta
*Attorney, Agent, or Firm*—Leonard C. Brenner; Ray G. Wilson; Judson R. Hightower

[57] ABSTRACT

A gated strip proportional detector includes a gas tight chamber which encloses a solid ground plane, a wire anode plane, a wire gating plane, and a multiconductor cathode plane. The anode plane amplifies the amount of charge deposited in the chamber by a factor of up to $10^6$. The gating plane allows only charge within a narrow strip to reach the cathode. The cathode plane collects the charge allowed to pass through the gating plane on a set of conductors perpendicular to the open-gated region. By scanning the open-gated region across the chamber and reading out the charge collected on the cathode conductors after a suitable integration time for each location of the gate, a two-dimensional image of the intensity of the ionizing radiation incident on the detector can be made.

18 Claims, 10 Drawing Figures

GATED STRIP PROPORTIONAL DETECTOR

This invention is the result of a contract with the Department of Energy (Contract No. W-7405-ENG-36).

BACKGROUND OF THE INVENTION

The present invention relates generally to the field of ionizing radiation beam detectors and more particularly to the field of two-dimensional ionizing radiation detectors.

Devices which can measure the centroid, width and cross-sectional distribution of ionizing radiation beams are often needed for tuning the source of such beams. Many devices are available for this task if only profile (one-dimensional) information is required. If two-dimensional information is required then the detection problem is much more difficult.

The most common method of providing two-dimensional information is to view a phosphor inserted in the beam with a television camera. Present television camera type detectors have relatively poor sensitivity and therefore are not suitable for viewing low intensity beams. Further the response of such systems generally have non-linearities which prevent or limit the acquisition of quantitative information.

It is therefore an object of the present invention to provide an improved two-dimensional ionizing radiation beam detector.

It is a further object of the present invention to provide a two-dimensional ionizing radiation beam detector of improved linearity and sensitivity.

SUMMARY OF THE INVENTION

To achieve the foregoing and other objects, and in accordance with the purposes of the present invention, as embodied and broadly described herein, the apparatus of this invention may comprise a chamber housing in close parallel configuration, a solid ground plane, a wire anode plane, a wire gating plane, and a multiconductor cathode plane. The anode plane amplifies the amount of charge deposited in the chamber by a factor of up to $10^6$. The gating plane allows only charge within a narrow strip to reach the cathode. The cathode plane collects the charge allowed to pass through the gating plane on a set of conductors perpendicular to the open-gated region. By scanning the open-gated region across the chamber and reading out the charge collected on the cathode conductors after a suitable integration time for each location of the gate, a two-dimensional image of the intensity of the ionizing radiation incident on the detector can be made.

An advantage of the present invention is that it provides a two-dimensional ionizing radiation beam detector of improved sensitivity.

Another advantage of the present invention is that it provides a two-dimensional ionizing radiation beam detector of improved linearity.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate the embodiment of the present invention and, together with the description, serve to explain the principles of the invention. In the drawings.

DETAILED DESCRIPTION OF THE PREFERRED EMBODIMENT

Figure 1:
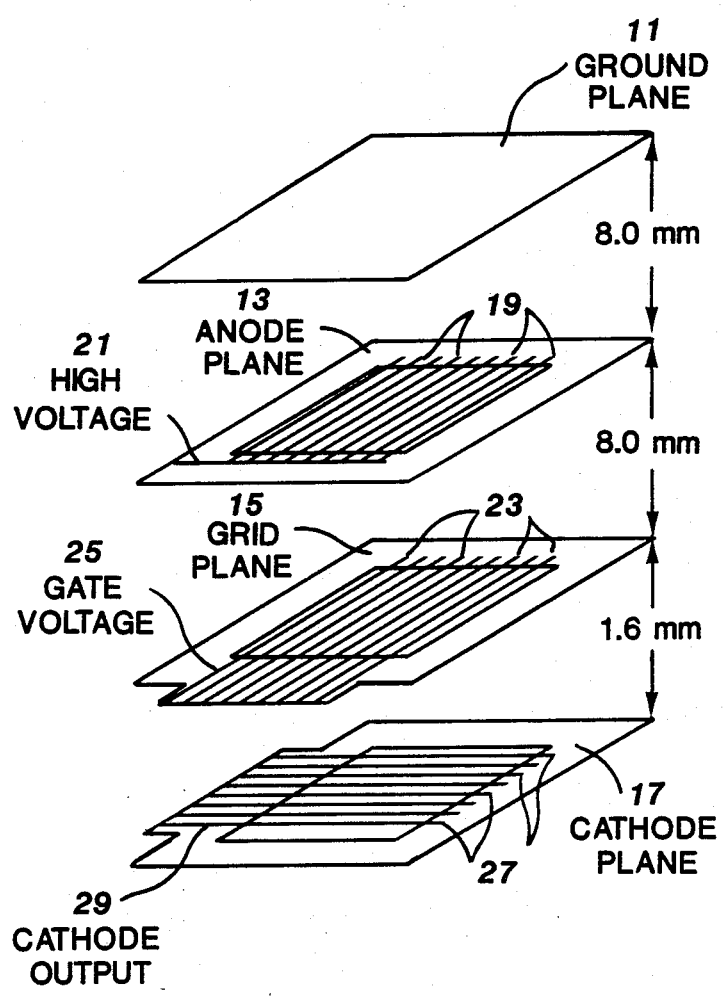
FIG. 1 is a schematic assembly view of a gated strip proportional detector fabricated in accord with the present invention.

With reference to FIG. 1, the detector of the present invention may comprise a ground plane 11, a wire anode plane 13, a wire gate plane 15, and a wire cathode plane 17, housed within a small chamber (not shown) having an active area of $4.8 \times 6.2$ cm$^2$.

The anode 13 may be constructed on a standard G-10 frame with anode wires 19 being 20 $\mu$m diameter gold plated tungsten wires with a 2.0 mm spacing. All anode wires 19 are bussed together to form a single connection 21 for high voltage biasing.

The grid 15 may be constructed on a standard G-10 frame with gate wires 23 being 76 $\mu$m diameter gold-plated, copper-clad aluminum with 0.5 mm spacing. The gate wires 23 are bussed together in contiguous groups of four to define by each group a 2.0 mm wide gate region. There are ninety-six grid wires 23 and hence twenty-four defined grid regions. Fewer are shown in FIG. 1 for clarity. The gate wires 23 are in parallel orientation with respect to the anode wires 19. Provision is made to input gate voltage to the grid wires 23 at input connections 25.

The cathode plane 17 may be constructed on a standard G-10 frame as a printed circuit board having 1.27 mm wide cathode conductors 27 printed thereupon with 2.54 mm spacing. The cathode connectors 27 are positioned orthogonal to the grid wires 23 and are twenty-five in number. Fewer are shown in FIG. 1 for clarity. Provision is made to output the detected charge on the cathode conductors 27 at output connections 29.

With the ninety-six grid wires 23 grouped in fours and the twenty-five cathode conductors 27 there are thus 600 pixels provided each with dimensions of 2.0×2.5 mm². The anode plane 13 is spaced 8.0 mm from the gate plane 15. The gate plane 15 is spaced 1.6 mm from the cathode plane 17.

Figure 2:
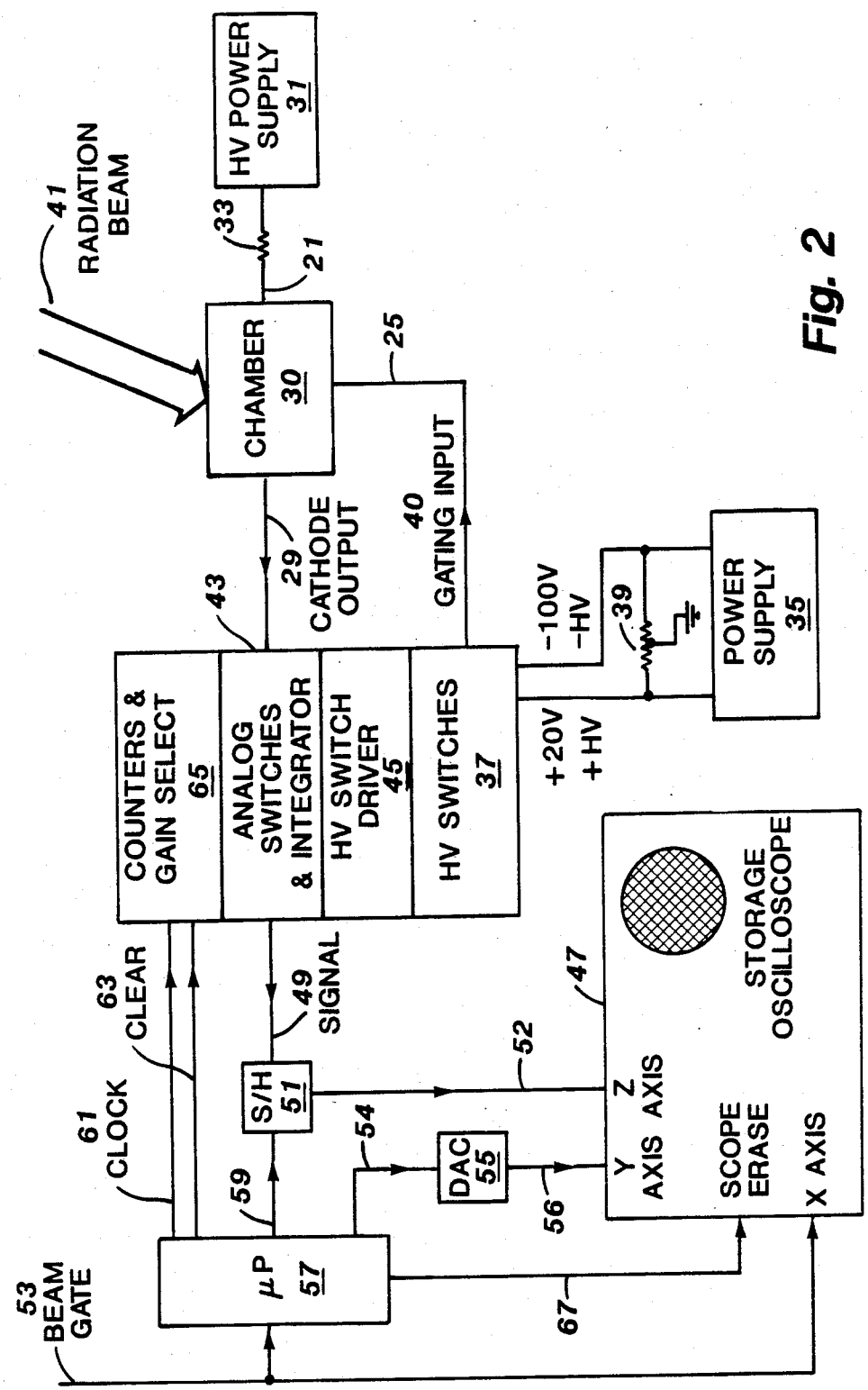
FIG. 2 is a block diagram of readout electronics for use with the gated strip proportional detector of FIG. 1.

The ground plane 11, anode plane 13, gate plane 15, and cathode plane 17 are housed in a small chamber 30 having an active area of 4.8×6.2 cm², see FIG. 2. The chamber 30 is a gas tight assembly and may be filled with a mixture of 40% ethane and 60% argon.

With continued reference to FIG. 2, it can be seen that a high voltage supply 31 is used to supply high voltage through a limiting resistor 33 in the range of three megohms to the anode connection 21. Nominally the high voltage supplied may be in the range of 2600 volts positive. For the embodiment described above 2600 volts provides the maximum gain on the order of $10^6$ and voltages above that level introduce undesirable sparking.

A floating power supply 35 is used to supply positive and negative voltage through a high voltage switch unit 37 to the twenty-four grid connections 25. A center-grounded potentiometer 39 permits relative adjustment of plus and minus. Successful operation occurs for the embodiment described above with a positive voltage level of 20 volts and a negative level of minus 100 volts.

With reference now again to FIG. 1, electrons produced by interactions of radiation in the chamber 30 gas drift to an anode wire 19 where they form avalanches. This results in a gain in the amount of charge deposited in the chamber 30 of up to $10^6$ depending upon the voltage applied to the anode voltage connection 21. If the wires 23 in the grid plane 15 are held at a negative voltage this charge is collected by the grid wires 23. However if at least two adjacent wires 23 in the grid plane 15 are at a positive voltage the positive charge can by pushed through the gate plane 15 and collected by the cathode plane 17. Successful operation occurs with the grid wires 23 switched between minus 20 and plus 100 volts.

With reference again to FIG. 2, the readout procedure consists of enabling a gate region for some suitable period of time by the high voltage switch unit 37. The optimum time period is a function of the incident beam 41 intensity and the anode 13 gain. Then the charge collected on each of the cathode conductors 27 are sequentially integrated and zeroed after which the gate region is advanced to the next region by the counters and gain select unit 65. The analog switch and integrator unit 43 receives charge from the cathode output connections 29. The counters and gain select unit 65 synchronizes the gating voltages by triggering the high voltage switch driver unit 45 which in turn operates the high voltage switch unit 37.

A display is formed on a storage oscilloscope 47. The analog output from the analog switch and integrator unit 43 generates a signal on line 49 which is fed to sample and hold circuit 51. The sample and hold circuit 51 feeds the Z (intensity) input of the oscilloscope 47. The start of the readout sequence is initiated by a beam gate signal on beam gate line 53 which triggers the X axis of the oscilloscope 47. The Y axis of the oscilloscope 47 is inputted by the output of a digital-to-analog converter 55 whose output is proportional to the location of the enabled gate region. The display is much like a TV picture of the incident beam 41.

A microprocessor 57 is triggered by the beam gate line 53 and generates the digital input to the digital-to-analog converter 51 on line 59. The microprocessor 57 provides further the synchronizing and housekeeping tasks of providing a clock signal on line 61 and a clear signal on line 63 to the counter and gain unit 65. It also generates an oscilloscope 47 erase signal on line 67. The microprocessor 57 may be an Intel 8085 microprocessor or another digital unit suited to the simple synchronizing and housekeeping tasks required.

The radiation beam 41 may be any suitable beam under investigation. Such a beam may be, for example, generated by a X-ray source ($Fe^{55}$) or with an X-ray beam.

Figure 3:
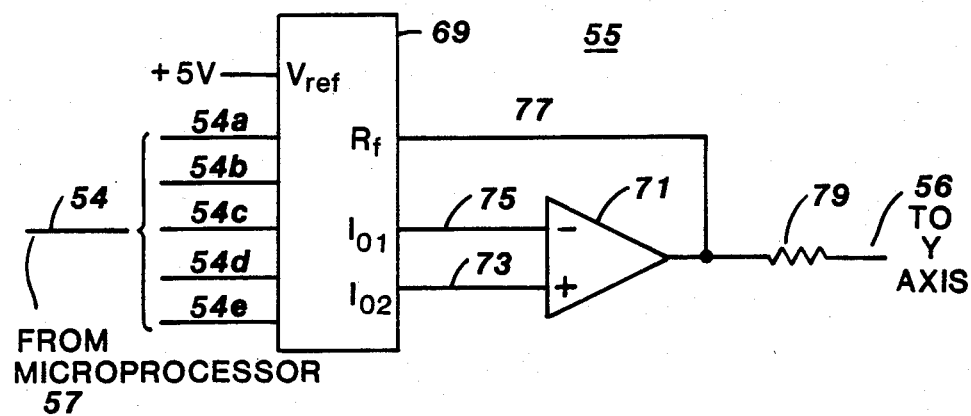
FIG. 3 is a schematic diagram of a digital-to-analog circuit used in the readout electronics of FIG. 2.

The digital-to-analog circuit 55 is detailed in FIG. 3. A digital input is provided on bus 54 from the microprocessor 57. This digital input may best be delivered in parallel on bus 54a through 54e. The digital input on bus 54 is converted into an analog signal by the digital-to-analog logic circuit 69 which may be a type AD7520 logic circuit. The output of the logic circuit 69 feeds a differential amplifier 71 which may be implemented as amplifier type LM301. The amplifier 71 has a positive input line 73 and a negative input line 75 connecting to the logic circuit 69. A feedback line 77 is also provided to the logic circuit 69. A resistor 79 is employed in series with line 56 which proceeds and connects to the Y axis of the oscilloscope 47. The resistor 79 may be a 1 kΩ resistor. The digital-to-analog circuit 55 functions to convert a numerical number on line 54 from microprocessor 57 into an analog voltage on line 56 to position the Y axis on the oscilloscpe 47.

Figure 4:
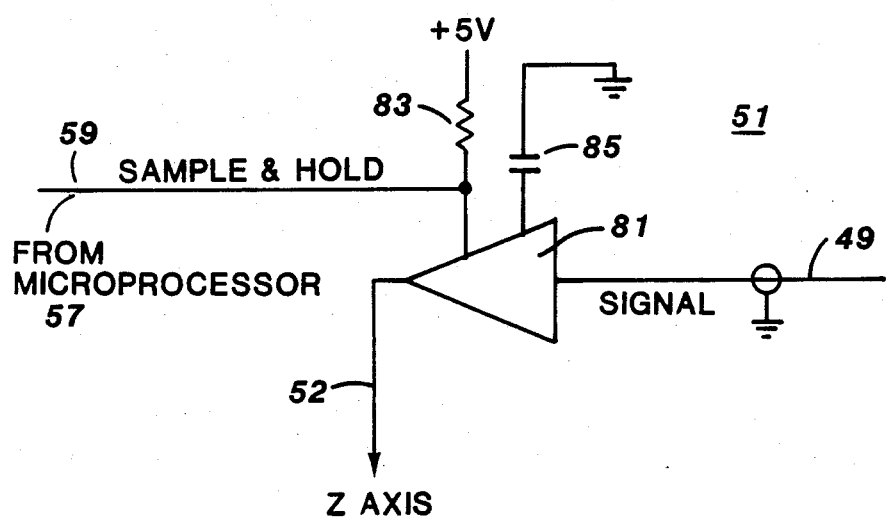
FIG. 4 is a schematic diagram of a sample-and-hold circuit used in the readout electronics of FIG. 2.

The sample-and-hold circuit 51 is detailed in FIG. 4. A sample-and-hold signal is provided on line 59 from the microprocessor 57 to a sample-and-hold amplifier 81. The sample-and-hold line 59 is biassed towards +5 volts through resistor 83 which may be a 2 kΩ resistor. The sample-and-hold amplifier which may be of type LF198 also has a connected and grounded holding capacitor 85 which may be a 10 kilo pF polycarbonate capacitor. The sample-and-hold amplifier 81 receives an analog signal on line 49 and converts it into a sample-and-hold output on line 52 which is provided to and controls the Z axis of the oscilloscope 47.

Figure 5:
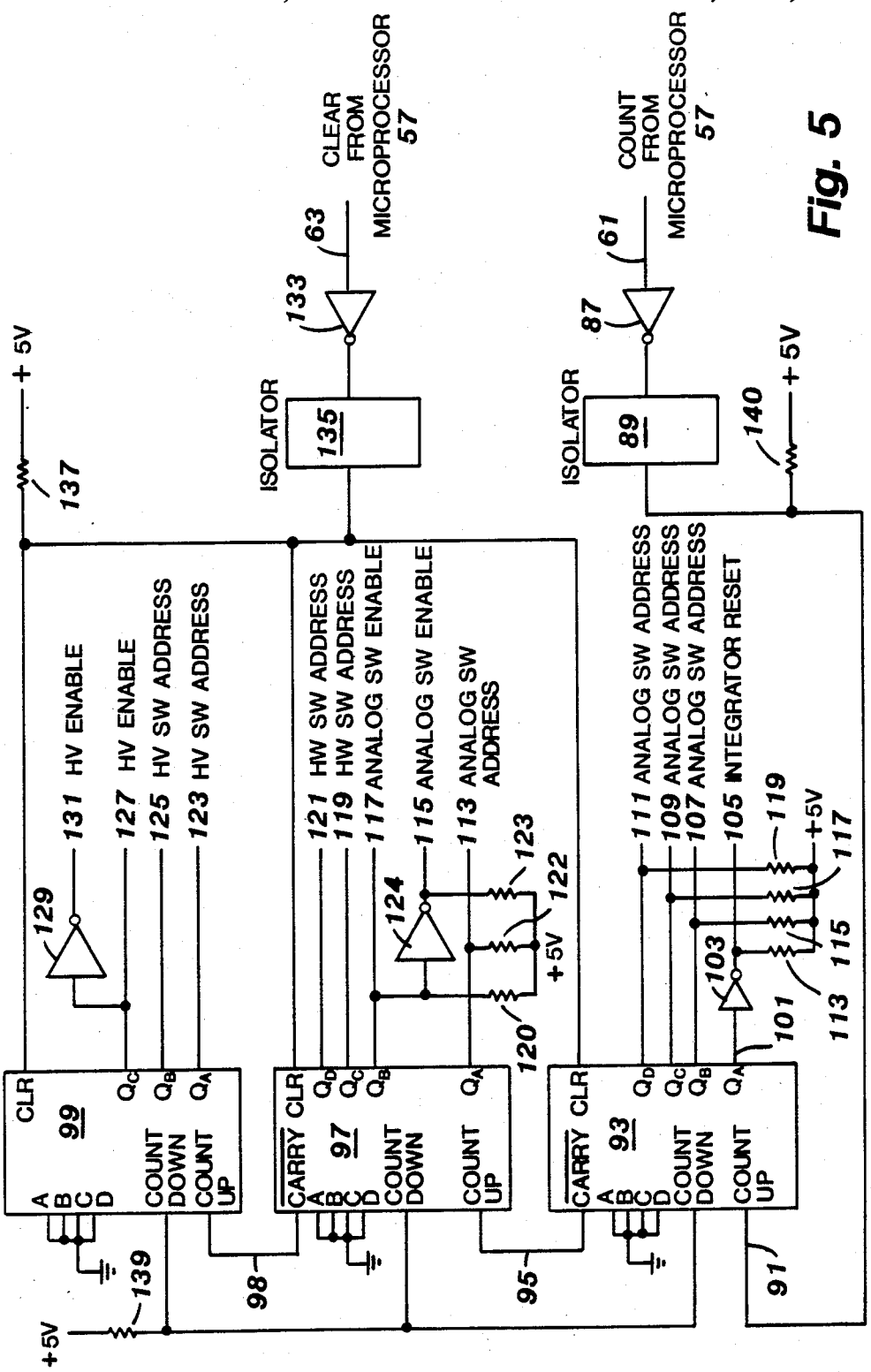
FIG. 5 is a logic diagram of the counter portion of a counter and gain select circuit used in the readout electronics of FIG. 2.

The counter portion of the counter and gain select circuit 65 is shown in FIG. 5. A clock type count pulse is provided from the microprocessor 57 on line 61 and is inverted by inverter 87 and provided to optoisolator 89. The optoisolator 89 may be of type HP5082-4360. The optoisolator 89 provides an output on line 91 to count up counter circuit 93. Counter circuit 93 carries through line 95 to count up counter circuit 97. Counter circuit 97 carries though line 98 to count up counter circuit 99. Counter circuits 93, 97, and 99 may be of type 74193. Counter circuit 93 provides a $Q_A$ output on line 101 which feeds through an inverter 103 to provide on line 105 an integrator reset signal. Line 105 is biassed towards 5 volts by resistor 113 which may be a 1 kΩ resistor. Counter circuit 93 also provides an output $Q_B$ on line 107 which provides an analog switch address. The line 107 is biassed towards 5 volts through resistor 115 which may be a 1 kΩ resistor. Counter 93 also provides output $Q_C$ on line 109 to provide an analog switch address. Line 109 is also biassed towards 5 volts through resistor 117 which may be a 1 kΩ resistor. Finally, counter circuit 93 provides an output $Q_D$ on line 111 which is an analog switch address. The line 111 is biassed towards +5 volts through resistor 119 which may be a 1 kΩ resistor.

Likewise counter 97 provides output $Q_A$ on line 113, $Q_B$ on 117, $Q_C$ on 119, and $Q_D$ on 121. Line 117 is fed through an inverter 124 to provide an output on line 115. Lines 113, 115, and 117 are biassed towards +5 volts through resistors 120, 122, and 123, which may all be 1 kΩ resistors.

Counter 99 provides output $Q_A$ on line 123, $Q_B$ on line 125, and $Q_C$ on line 127. Line 127 further provides through an inverter 129 an output on line 131.

A clear signal is provided from the microprocessor 57 on line 63 through inverter 133 and through optoisolator 135 to the clear inputs on counters 93, 97, and 99. The clear inputs are also biassed towards +5 volts through resistor 137 which may be a 1 kΩ resistor. The count down inputs of counters 93, 97, and 99 are tied together and biassed towards +5 volts through resistor 139 which may be a 1 kΩ resistor. Likewise line 91 is biassed towards 5 volts through resistor 140 which may be a 1 kΩ resistor.

Figure 6:
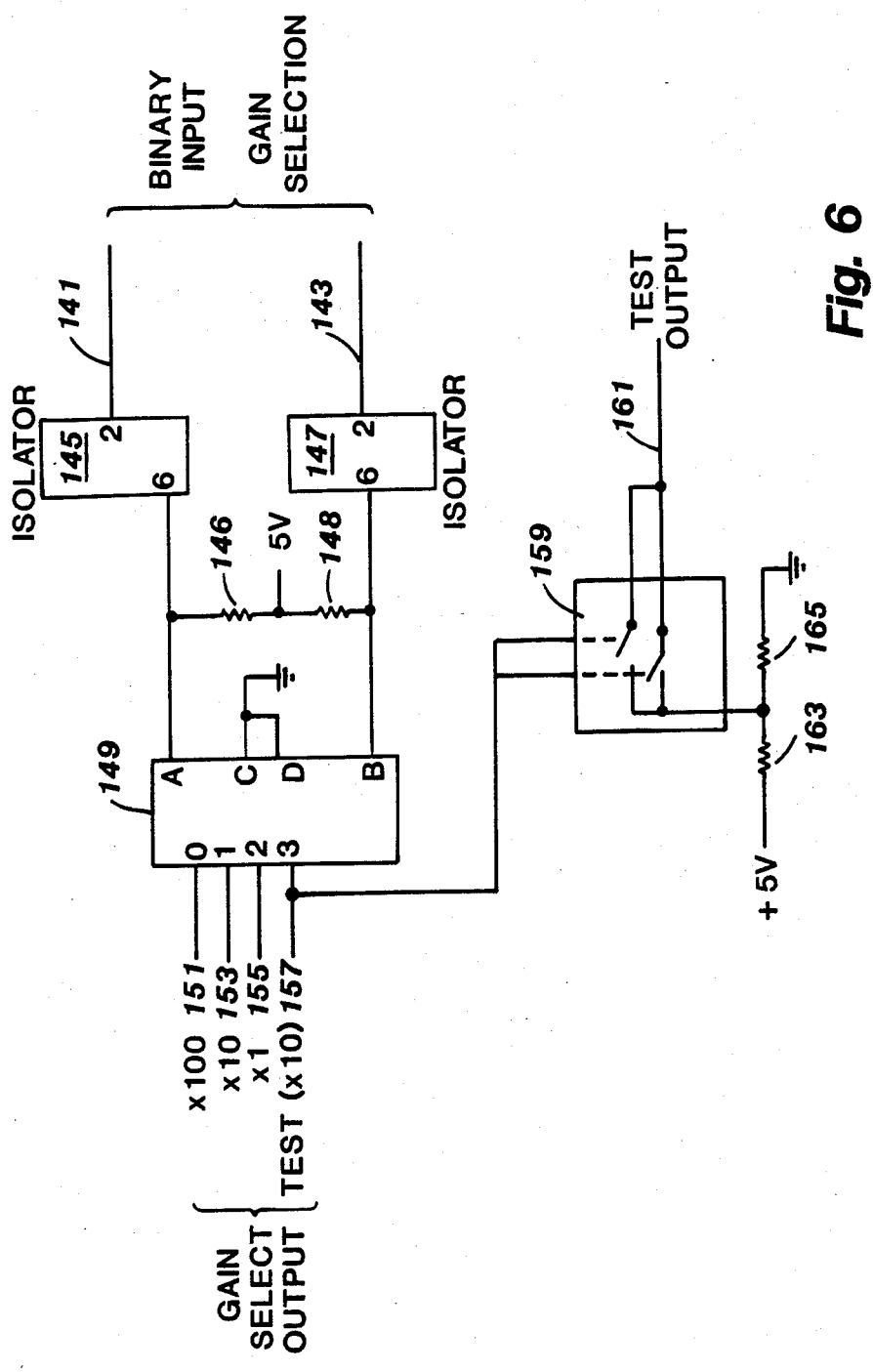
FIG. 6 is a logic diagram of the gain select portion of the counter and gain select circuit used in the readout electronics of FIG. 2.

The gain select portion of the counter and gain select circuit 65 is detailed in FIG. 6. Binary gain selection is provided as desired on lines 141 and 143. When lines 141 and 143 are both at logical zeros a gain of ×10 is provided for a test output. When lines 141 and 143 are both at a logical one then a ×10 gain is also provided. When line 141 is at zero and line 143 is at one then a ×100 gain is provided. Finally, when line 141 is at one and line 143 is at zero than a ×1 gain is provided. The 141 feeds through optoisolator 145 to decoder 149. Line 143 feeds through optoisolator 147 to the decoder 149. The optoisolators 145 and 147 may be of type HP5082-4360. Biassing is provided for the output of the optoisolators 145 and 147 by resistors 146 and 148 which may be 1 kΩ resistors. The decoder 149 decodes the binary signal received to provide an output on one of the output lines 151, 153, 155, and 157. An output of line 155 indicates a ×1 gain, an output on line 153 indicates a ×10 gain, an output on line 151 indicates a ×100 gain, while an output on line 157 indicates a ×10 gain during a test mode. The output on line 157 controls an electronic switch 159 to provide a test output signal on line 161. The switch 159 may be of type DG172. The test output on line 161 is a voltage as determined by biassing resistors 163 and 165. Resistor 163 may be a 3.9 kΩ resistor while resistor 165 may be a 1 kΩ resistor.

Figure 7:
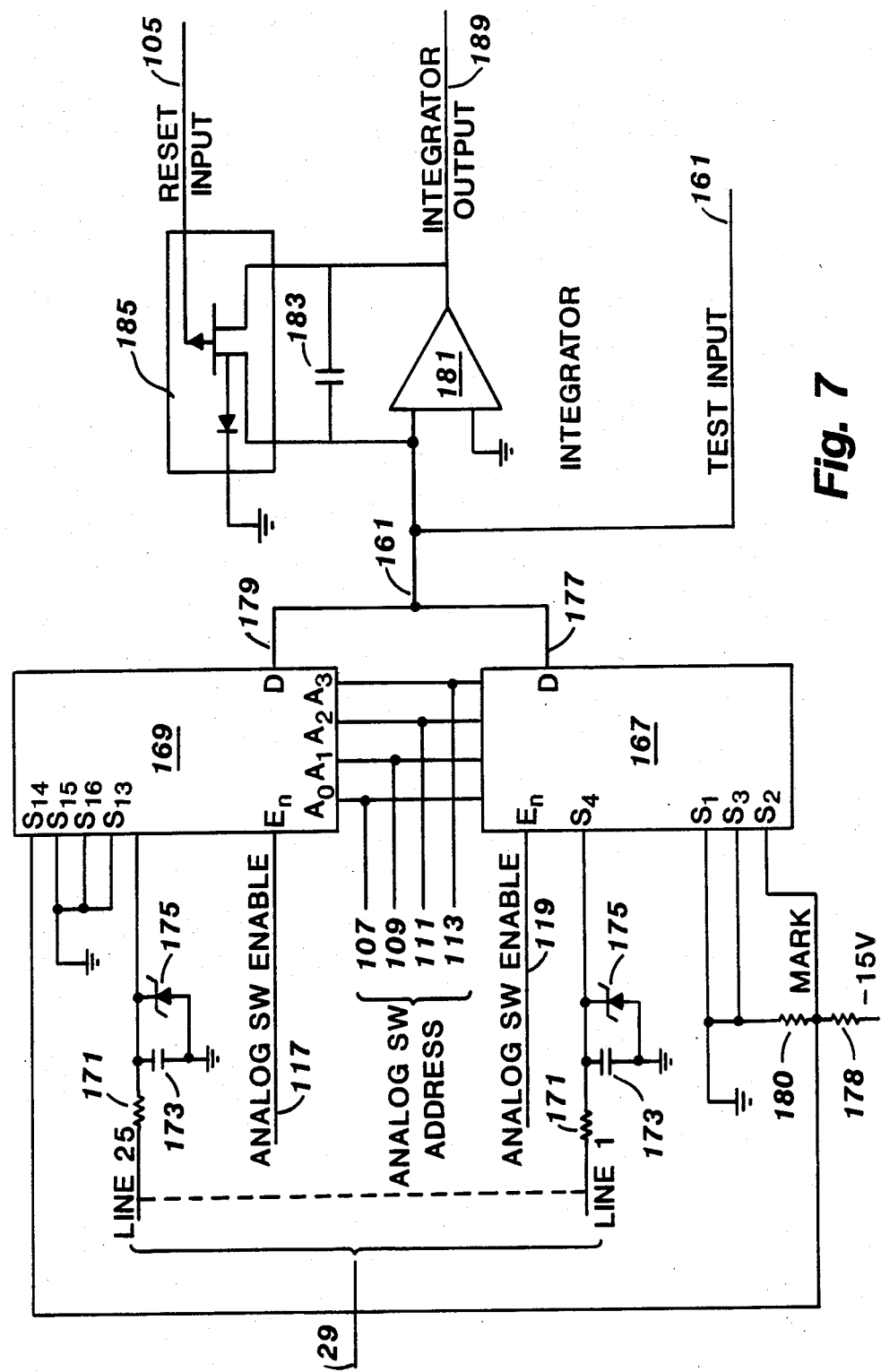
FIG. 7 is a circuit diagram of the first portion of an analog switch and integrator circuit used in the readout electronics of FIG. 2.

The first portion of the analog switch and integrator circuit 43 is detailed in FIG. 7. Input is provided on bus 29 which was as shown in FIG. 1 and FIG. 2 as the cathode output from chamber 30. The bus 29 is in reality twenty-five identical lines each having in series resistor 171 and in parallel to ground capacitor 173 and zener diode 175. Resistor 171 may be 110 Ω resistor, capacitor 173 may be a 10 kilo pF capacitor, and the zener diode 175 may be of type of 1N4735A. The bus 29 feeds analog switches 167 and 169 which may be of type AD7506JN. The analog switches 167 and 169 provide an output on lines 177 and 179 respectively which connect together to form output line 161. The output on line 161 is one of the inputs of the twenty-five lines of bus 29 as determined by the analog switch address provided in digital form on lines 107, 109, 111, and 113 as provided from the counter and gain select circuit 65 detailed in FIG. 5. Further, either analog switch 167 or analog switch 169 is enabled as determined by an analog switch enable signal on lines 117 and 119 as provided as shown in FIG. 5. A mark signal is provided to the analog switches 167 and 169 is biassed by resistors 178 and 180. Resistor 178 may be a 100 kΩ resistor whereas resistor 180 may be a 100 Ω resistor. The output 161 is fed through an integrator amplifier 181 to provide an integrator output 189. The integrator amplifier 181 may be of type LM308. The integrator amplifier 181 has an integrator capacitor 183 which may be shorted by a reset switch 185 as determined by an input on reset line 105. The reset switch 185 may be of type IH5024. A fixed test input may also be provided to the integrator amplifier 181 on line 161 as provided as shown in FIG. 6.

Figure 8:
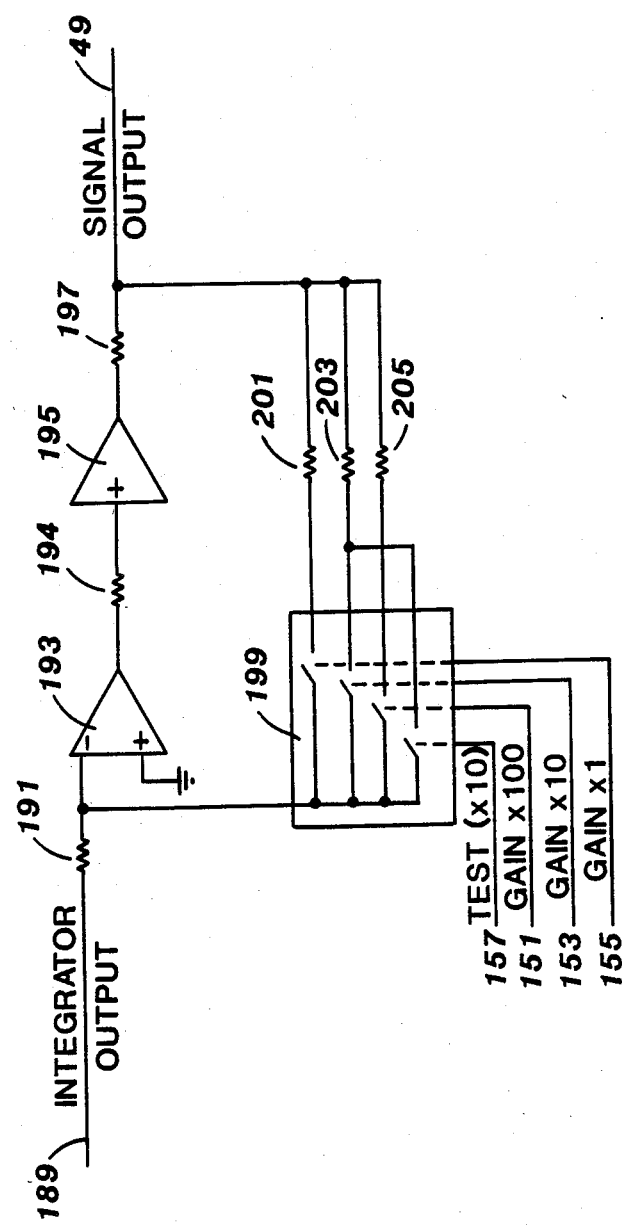
FIG. 8 is a circuit diagram of the second portion of the analog switch and integrator circuit used in the readout electronics of FIG. 2.

The integrator output 189 of FIG. 7 provides input to a differential amplifier 193 as shown in FIG. 8. The output of differential amplifier 193 feeds through resistor 194 to amplifier 195. Amplifier 195 outputs a signal through resistor 197 to signal output line 49. Further, feedback resistors 201, 203, and 205 are selected by switch 199 as determined by the gain select input on lines 151, 153, 155, and 157. The switch 199 may be of type IH5010. Thus gain is determined as a function of the resistor 191 and selected feedback resistors 201, 203, and 205. The differential amplifier 193 may be of type LM301 and the amplifier 195 may be of type LH0002. The signals on lines 151, 153, 155, and 157 are generated as shown in FIG. 6.

Figure 9:
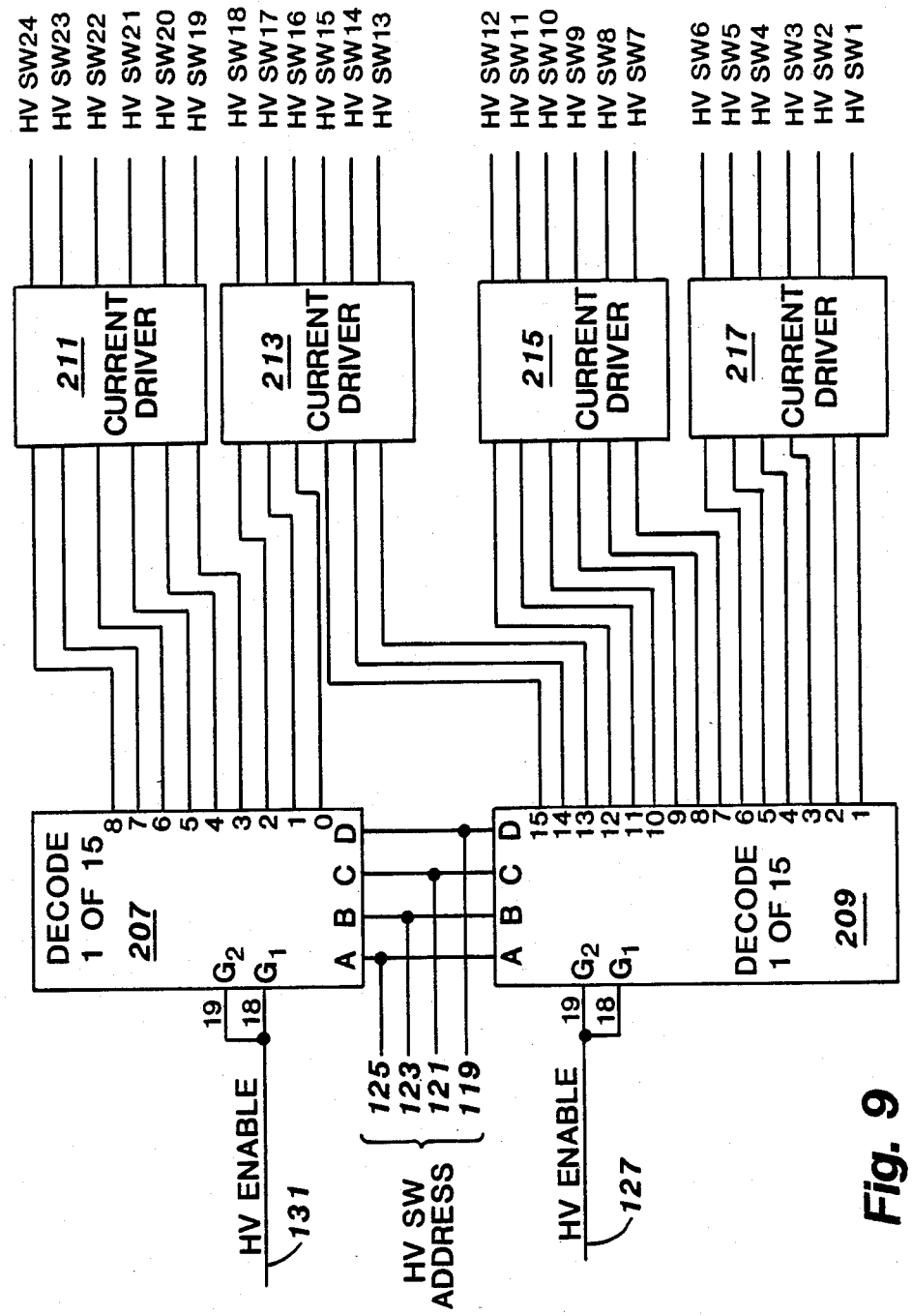
FIG. 9 is a logic diagram of a high voltage switch driver circuit used in the readout electronics of FIG. 2.

Details of the high voltage switch driver 45 are shown in FIG. 9. One of twenty-four high voltage switches designated HV SW1 through HV SW24 is selected as will be described. A high voltage switch address signal is provided in digital form on lines 119, 121, 122, and 125 to decoders 207 and 209. The high voltage switch address signal on lines 119, 121, 123, and 125 is generated as shown in FIG. 5. Decoders 207 and 209 provide a single output as a function of the high voltage switch address input. Further, either decoder 207 or 209 is enabled as determined by the high voltage enabled signals on lines 127 and 131 generated as shown in FIG. 5. The decoders 207 and 209 may be of type 74154. The decoders 207 and 209 drive through current drivers 211, 213, 215, and 219 to provide a high voltage switch signal on one of the lines HV SW1 through HV SW24. The current drivers 211, 213, 215, and 217 may be implemented as a buffer current drivers type 7407.

Figure 10:
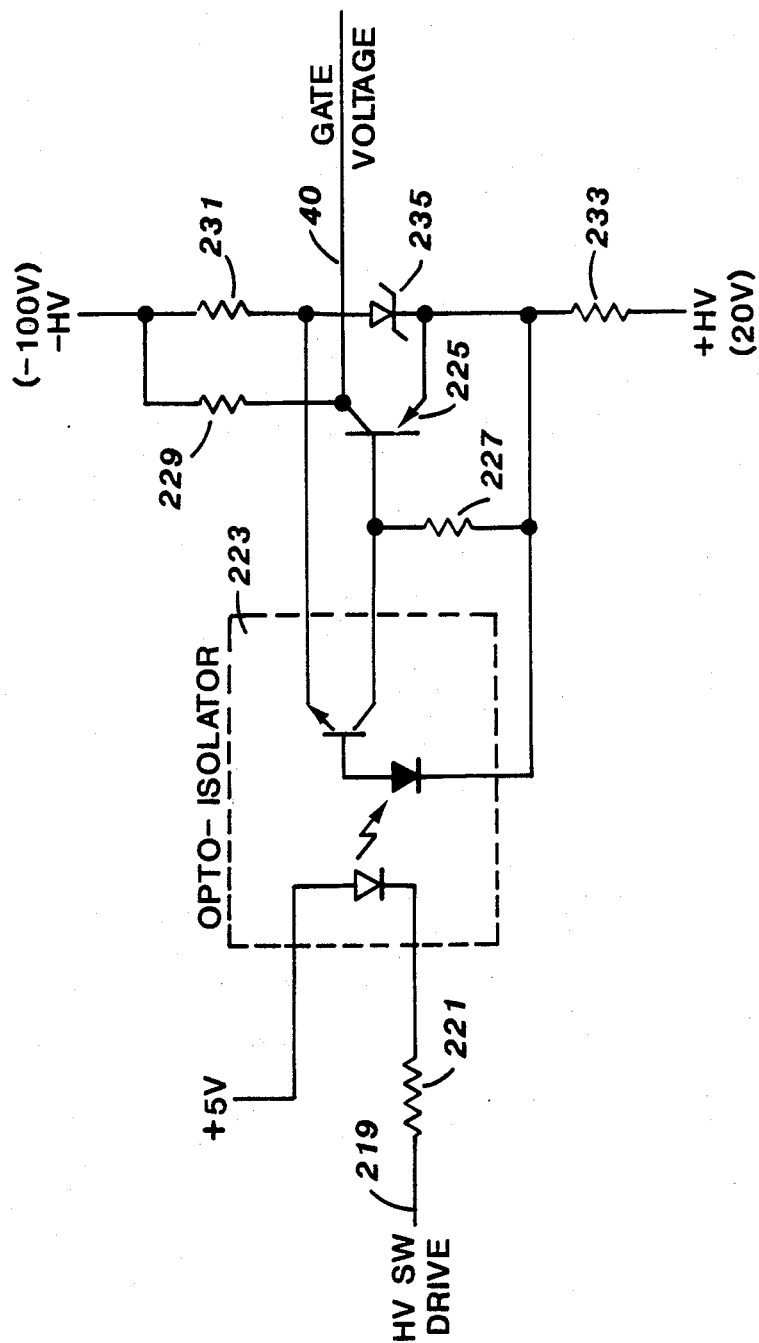
FIG. 10 is a circuit diagram of one of twenty-four identical high voltage switches used in the readout electronics of FIG. 2.

Each one of the twenty-four high voltage switches HV SW1 through HV SW4 is implemented as shown in FIG. 10. In high voltage switch drive provided on line 219 generated as shown in FIG. 9. A signal on line 219 passes though resistor 221 to optoisolator 223. The optoisolator 223 drives a transistor 225 to provide a gate output signal on line 40. Biassing resistors 227, 229, 231, and 233 are provided as shown in FIG. 10 along with zener diode 235. Resistor 221 may be a 200 Ω resistor, resistor 227 may be a 6.2 kΩ resistor, resistor 229 may be 68 kΩ, resistor 231 may be 500 kΩ and resistors 233 may be 3.3 kΩ. The optoisolator 223 may be of type HP5082-4352. The transistor 225 may be of type 2N5416, and the zener diode 235 may be of type 1N4735A.

The foregoing description of the preferred embodiment of the invention have been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A gated strip proportional detector comprising:
chamber means for intercepting a radiation beam;
detector means for detecting radiation within said chamber means, said detector means having a ground plane, an anode plane having a plurality of parallel anode wires thereon connected together at one end and biased to a high voltage level effective to generate a charge avalanche in response to said radiation beam, a gate plane having a first plurality of gate wires thereon parallel to said anode wires, and a cathode plane having a second plurality of cathode wires thereon orthogonal to said anode and said gate wires, said ground, anode, gate, and cathode planes being positioned in order in close parallel proximity;
scanning means for sequentially energizing pairs of said first plurality of gate wires in a scanning sequence effective to pass charge adjacent said pair of energized gate wires while unenergized ones of said gate wires collect charge from said charge avalanche;
readout means for sequentially enabling individual wires of said second plurality of cathode wires orthogonal with said energized pair of gate wires to collect charge passing said energized gate wires, said readout means synchronized with said scanning means and providing an electrical output representative of the charge collected by each individual wire;
display means for visibly displaying the electrical output of said readout means; and
control means for providing control and synchronizing signals to said scanning means, said readout means, and said display means effective to form the visible display of said display means as a two dimensional representation of the intensity of said radiation beam intercepted by said chamber means.

2. The gated strip proportional detector of claim 1 wherein said chamber means comprises a small gas tight chamber having an active region of approximately 4.8 cm by 6.2 $cm^2$ and is filled with gas of approximately 40% ethane and 60% argon concentration.

3. The gated strip proportional detector of claim 1 wherein said plurality of parallel anode wires is a plurality of 20 $\mu$m diameter wires having a 2.0 mm spacing between, said plurality of parallel gate wires is a plurality of ninety-six 76 $\mu$m diameter wires having a 0.5 mm spacing therebetween and being bussed together in contiguous groups of four to define twenty-four grid regions of 2.0 mm width; and said plurality of parallel cathode wires is a plurality of twenty-five wires having a spacing of 2.54 mm therebetween.

4. The gated strip proportional detector of claim 2 wherein said plurality of parallel anode wires is a plurality of 20 $\mu$m diameter wires having a 2.0 mm spacing between, said plurality of parallel gate wires is a plurality of ninety-six 76 $\mu$m diameter wires having a 0.5 mm spacing therebetween and being bussed together in contiguous groups of four to define twenty-four grid regions of 2.0 mm width; and said plurality of parallel cathode wires is a plurality of twenty-five wires having a spacing of 2.54 mm therebetween.

5. The gated strip proportional detector of claim 1 wherein said scanning means for sequentially energizing said pairs of gate wires provides voltages of approximate plus 20 volts in its unenergizing state and minus 100 volts in its energizing state.

6. The gated strip proportional detector of claim 4 wherein said scanning means for sequentially energizing said pairs of gate wires provides voltages of approximate plus 20 volts in its unenergizing state and minus 100 volts in its energizing state.

7. The gated strip proportional detector of claim 1 wherein said readout means includes a plurality of analog switches, one analog switch therein connected to each wire in said plurality of cathode wires to be read, and means for sequentially enabling individual analog switches therein.

8. The gated strip proportional detector of claim 6 wherein said readout means includes a plurality of analog switches, one analog switch therein connected to each wire in said plurality of cathode wires to be read, and means for sequentially enabling individual analog switches therein.

9. The gated strip proportional detector of claim 1 wherein said display means comprises a storage oscilloscope.

10. The gated strip proportional detector of claim 8 wherein said display means comprises a storage oscilloscope.

11. The gated strip proportional detector of claim 1 wherein said control means comprises a microprocessor.

12. The gated strip proportional detector of claim 10 wherein said control means comprises a microprocessor.

13. A gated strip proportional detector comprising:
chamber means for intercepting a radiation beam;
detector means for detecting radiation within said chamber means, said detector means having a ground plane, an anode plane having a plurality of parallel anode wires thereon connected together at one end and biased to a high voltage level effective to generate a charge avalanche in response to said radiation beam, a gate plane having a first plurality of gate wires thereon parallel to said anode wires, and a cathode plane having a second plurality of cathode wires thereon orthogonal to said anode and said gate wires, said ground, anode, gate, and cathode planes being positioned in order in close parallel proximity; digital scanning means for sequentially energizing pairs of said first plurality of gate wires in a scanning sequence effective to pass charge adjacent said pair of energized gate wires while unenergized gate wires collect charge from said charge avalanche, said digital scanning means having
a bipolar power supply for supplying a positive and a negative voltage;
a plurality of solid-state high voltage switches, each switch therein connected individually to an individual wire in said plurality of gate wires and to said bipolar power supply for switching between said positive voltage and said negative voltage indicating an unenergized state and an energized state respectively;
a digital high voltage switch driver circuit addressable to select and drive any one of said plurality of solid-state high voltage switches from its unenergized positive voltage state to its energized negative voltage state;
addressing means for addressing said driver circuit to energize said pairs of gate wires in said scanning sequence; and readout means for sequentially enabling individual wires of said second plurality of cathode wires, and for providing an electrical output representative of the charge collected by each individual wire as it is read, said readout means having
- a plurality of analog switches, each switch therein individually associated with a wire to be read in said second plurality of cathode wires, said plurality of analog switches being addressable to sequence through individual switches therein; and signal processing means including an integrator and an adjustable gain amplifier for generating said electrical output representative of the charge collected by each individual wire as it is read;

digital counter means for sequentially addressing said digital high voltage switch driver circuit and in synchronism therewith sequentially addressing said plurality of analog switches;

storage oscilloscope display means for visibly displaying said electrical output of said readout means; and microprocessor control means for providing control and synchronizing signals to said digital scanning means, said readout means, said digital counter means, and said display means effective for the visible display of said display means to form a two dimensional representation of the intensity of said radiation beam intercepted by said chamber means.

14. The gated strip proportional detector of claim 13 wherein said chamber means comprises a small gas tight chamber having an active region of approximately 4.8 cm by 6.2 cm$^2$ and is filled with gas of approximately 40% ethane and 60% argon concentration.

15. The gated strip proportional detector of claim 13 wherein said plurality of parallel anode wires is a plurality of 20 μm diameter wires having a 2.0 mm spacing between, said plurality of parallel gate wires is a plurality of ninety-six 76 μm diameter wires having a 0.5 mm spacing therebetween and being bussed together in contiguous groups of four to define twenty-four grid regions of 2.0 mm width; and said plurality of parallel cathode wires is a plurality of twenty-five wires having a spacing of 2.54 mm therebetween.

16. The gated strip proportional detector of claim 14 wherein said plurality of parallel anode wires is a plurality of 20 μm diameter wires having a 2.0 mm spacing between, said plurality of parallel gate wires is a plurality of ninety-six 76 μm diameter wires having a 0.5 mm spacing therebetween and being bussed together in contiguous groups of four to define twenty-four grid regions of 2.0 mm width; and said plurality of parallel cathode wires is a plurality of twenty-five wires having a spacing of 2.54 mm therebetween.

17. The gated strip proportional detector of claim 13 wherein said digital scanning means for sequentially energizing said pairs of gate wires provides voltages of approximate plus 20 volts in its unenergizing state and minus 100 volts in its energizing state.

18. The gated strip proportional detector of claim 16 wherein said digital scanning means for sequentially energizing said pairs of gate wires provides voltages of approximate plus 20 volts in its unenergizing state and minus 100 volts in its energizing state.

* * * * *